May 4, 1965

W. F. PAUL 3,181,815

ROTOR VIBRATION REDUCTION CAP

Filed April 27, 1962

INVENTOR
WILLIAM F. PAUL

BY *Jack N. McCarthy*

AGENT

United States Patent Office 3,181,815
Patented May 4, 1965

3,181,815
ROTOR VIBRATION REDUCTION CAP
William F. Paul, Trumbull, Conn., assignor to United Aircraft Corporation, East Hartford, Conn., a corporation of Delaware
Filed Apr. 27, 1962, Ser. No. 190,745
6 Claims. (Cl. 244—17.11)

This invention relates to means for reducing vibration encountered in helicopters, especially during high speed flight and due to aerodynamic excitation of the tail section. The vibrations are primarily attributed to the flow of turbulent air from the rotor head flowing across the tail area.

On object of this invention is to provide a dome-shaped device over the rotor head. It is not an object to fair pairs of the rotor head which are prime contributors of drag to reduce their drag. The dome or dome-shaped cap is not used to cover a nonstreamlined object to reduce total drag.

Another object of this invention is to provide a dome-shaped cap over the rotor head which will not interfere with any movements of the rotor head necessary for helicoper operation.

A further object of this invention is to provide a device for reducing vibration in a helicopter which can be readily applied to existing aircraft.

Another object of this invention is to provide a vibration reducing device, which, while it is not mounted as a fairing, will permit portions of the rotor head to project thereinto if necessary.

A further object of this invention is to provide a device which will reduce vibrations in a helicopter even though it increases total drag.

These and other objects and advantages of the invention will become apparent with a reading of the following detailed description of the drawings in which one embodiment is illustrated.

Figure 1:
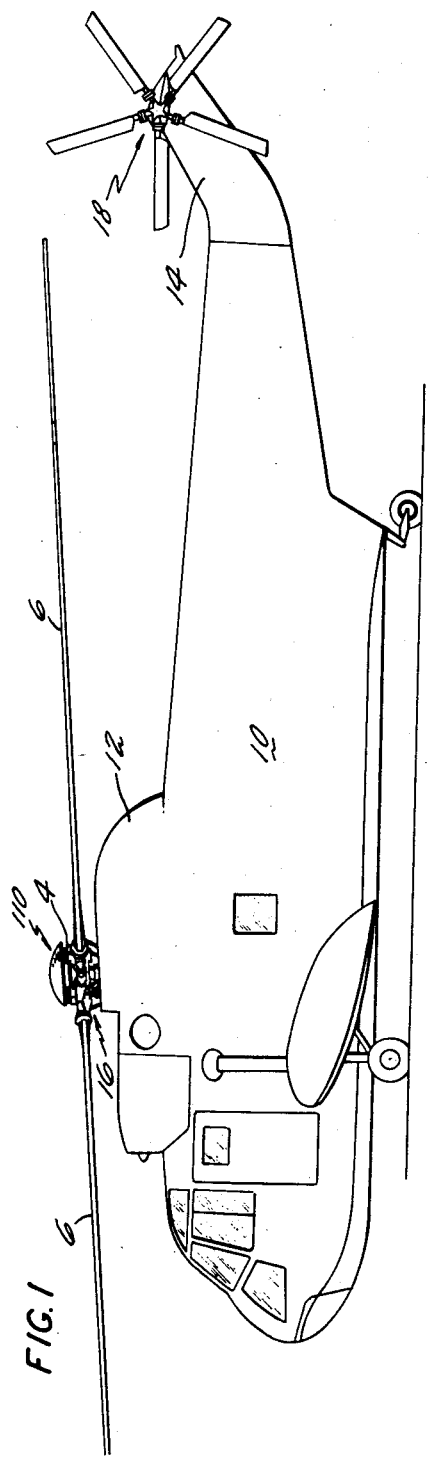
FIG. 1 is a side elevational view of the helicopter showing the vibration reducing device or cap installed over the rotor head.

Referring to FIG. 1, the helicopter embodying the invention comprises an essentially enlarged fuselage 10 having a main rotor pylon 12 and a tail rotor pylon 14 on which are mounted the main rotor generally indicated at 16 and a tail rotor generally indicated at 18. The main rotor 16 comprises a rotor head 4 having rotor blades 6 mounted thereon for pitch changing movement. The rotor head 4 is mounted for rotation on a conventional shaft.

The rotor head 4 can be of the type shown in United States Patent No. 2,774,553. The root end of each blade 6 is bolted to the outboard end of a blade supporting the sleeve 78. Each sleeve 78 is mounted for rotation on a spindle which extends outwardly as part of the flapping link 74. A pitch horn 80 extends from each sleeve 78 with its free end being attached to a control rod 84 to provide for pitch changing movement of the blade. Any known pilot control means can be used to actuate the push-pull rods 84.

The inner end of each flapping link 74 is connected to a drag hinge 60. The upper and lower ends of each drag hinge 60 is journalled in a bearing. Each bearing is fixed within the upper and lower plates 42 and 44, respectively, of the rotor head. The plates are formed having an equal number of extending arms. The plates are positioned so that the arms are located over each other. The bearings for each drag hinge are located adjacent the free end of each of the cooperating arms. Closure caps 69 are fixed at each end of the drag hinge to enclose the bearings and to confine the usual lubricant provided for the bearings.

A damper 106 is located on the rotor head for each blade. A lteral extension 94 extends from each flapping hinge and is connected to its respective damper by a pivotal joint 100.

Figure 3:
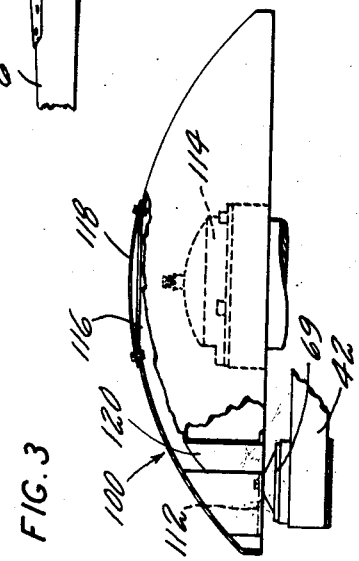
FIG. 3 is an enlarged view of the vibration reducing device showing its attachment to the top of a drag hinge.

A dome-shaped cap 110 is mounted on top of the rotor head 4 to the tops of each of the closure caps 69 covering the upper part of the drag hinges. This cap 110 has a dome-shaped top with an annular inwardly extending flange 112 around its lower edge. Bolts extend through this flange into each closure cap 69. The opening in the center is provided to permit this space to be used if necessary. As shown in FIG. 3, a reservoir 114 is positioned on top of the drive shaft to provide lubrication for parts of the rotor head. An opening 116 is provided at the top of the dome for access to the top of the rotor head. A transparent portion 118 is bolted around the edge of the opening to provide a means for merely viewing the top of the rotor head under the cap. Reinforcing ribs 120 extend around the inner part of the dome between the flange 112 and the inner side of the upper portion of the dome.

Figure 2:
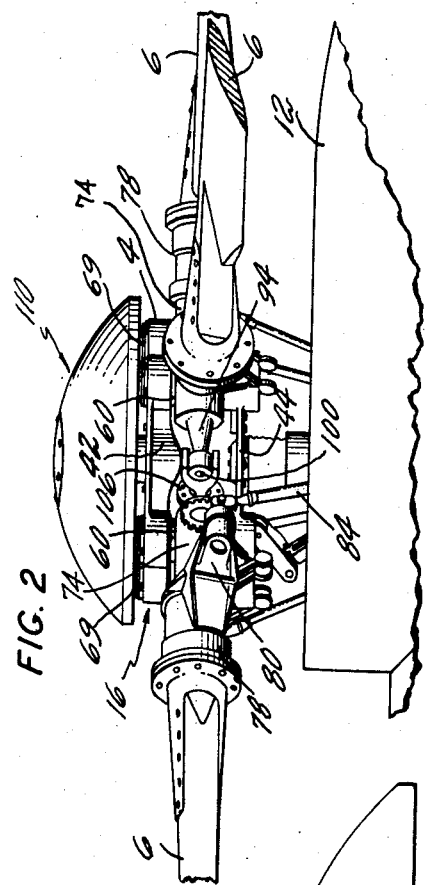
FIG. 2 is an enlarged view of the rotor head showing the location of the vibration reducing device in more detail.

The dome-shaped cap 100, as viewed in FIGS. 1–3, has a ratio of its height at its center point to its diameter at its base of approximately 1–4 . While this ratio has been shown, the contour of a cap or dome can be varied between the ratios of 1–2 and 1–7, depending on the size and shape of the rotor head and helicopter for which the cap or dome is required. The installation of cap 100 increases the total drag of a helicopter.

It is to be understood that the invention is not limited to the specific embodiment herein illustrated and described, but may be used in variations without departure from its spirit as defined in the following claims.

I claim:
1. In a helicopter,
   (a) a fuselage,
   (b) a rotor head,
   (c) said fuselage extending rearwardly of said rotor head,
   (d) means mounting said rotor head on said fuselage,
   (e) portions of said rotor head being non-tilting with relation to said fuselage,
   (f) blades attached to said rotor head for pitch changing movement,
   (g) means for controlling pitch changing movement of said blades, and
   (h) means for reducing vibration in said fuselage,
   (i) said means comprising a cap fixed to the non-tilting part of said rotor head,
   (j) said cap being spaced from said rotor head and said control means with the bottom of said cap terminating in a position above said control means.
2. In a helicopter,
   (a) a fuselage,
   (b) a rotor head,
   (c) said fuselage extending rearwardly of said rotor head,
   (d) means mounting said rotor head on said fuselage for rotation,
   (e) blades attached to said rotor head for pitch changing movement,
   (f) means for controlling pitch changing movement of said blades, and
   (g) means for reducing vibration in said fuselage,
   (h) said means comprising a dome-shaped cap fixed to the top of said rotor head,

(i) said cap being spaced from said rotor head and said control means with the bottom of said cap terminating in a position above said control means so that air flows around the rotor head and control means, (j) said cap having a ratio of its height at its center portion to its diameter at its base of between 1 to 2 and 1 to 7.

3. In a helicopter,
(a) a fuselage,
(b) a rotor head,
(c) said fuselage extending rearwardly of said rotor head,
(d) means mounting said rotor head on said fuselage for rotation,
(e) blades attached to said rotor head for pitch changing movement,
(f) means for controlling pitch changing movement of said blades,
(g) means increasing total drag of the fuselage and rotor head for reducing vibration in said fuselage,
(h) said means comprising a cap fixed to the top of said rotor head,
(i) said cap being spaced from said rotor head and said control means with the bottom of said cap terminating in a position above said control means to permit a flow of air thereunder.

4. In a helicopter,
(a) a fuselage,
(b) a shaft,
(c) a rotor head mounted on said shaft for rotation,
(d) said fuselage extending rearwardly of said rotor head,
(e) blades attached to said rotor head for pitch changing movement,
(f) means for controlling pitch changing movement of said blades, and
(g) means for reducing vibration in said fuselage,
(h) said means comprising a cap fixed to the top of said rotor head in a fixed relation to said shaft,
(i) said cap being spaced from said rotor head and said control means with the bottom of said cap terminating in a position above said control means to permit a flow of air thereunder.

5. In a helicopter,
(a) a fuselage,
(b) a rotor head,
(c) said fuselage extending rearwardly of said rotor head,
(d) means mounting said rotor head on said fuselage for rotation,
(e) part of said rotor head being non-tilting with relation to said fuselage,
(f) means for reducing vibration in said fuselage,
(g) said vibration reducing means comprising a cap fixed to the non-tilting part of said rotor, and
(h) said cap being spaced from said rotor head to permit a flow of air beneath said cap.

6. In a helicopter,
(a) a fuselage,
(b) a rotor head,
(c) said fuselage extending rearwardly of said rotor head,
(d) means mounting said rotor head on said fuselage for rotation,
(e) part of said rotor head being non-tilting with relation to said fuselage,
(f) blades attached to said rotor head for pitch changing movement,
(g) means for controlling pitch changing movement of said blades, and
(h) means for reducing vibration in said fuselage,
(i) said means comprising a dome-shaped cap fixed to the non-tilting part of said rotor head,
(j) said cap being spaced from said rotor head and said control means with the bottom of said cap terminating in a position above said control means so that air flows around the rotor head and control means,
(k) said cap having a ratio of its height at its center portion to its diameter at its base of between 1 to 2 and 1 to 7.

References Cited by the Examiner
UNITED STATES PATENTS

| 2,755,038 | 7/56 | Gluhareff | 244—17.11 X |
| 2,755,871 | 7/56 | Gerstenberger | 244—71.11 |
| 3,056,456 | 10/62 | Michel et al. | 170—160.12 X |
| 3,087,690 | 4/63 | Doman et al. | 244—17.27 |

FOREIGN PATENTS 133,944   8/49   Australia.

FERGUS S. MIDDLETON, *Primary Examiner.*

MILTON BUCHLER, *Examiner.*